Figure 1:
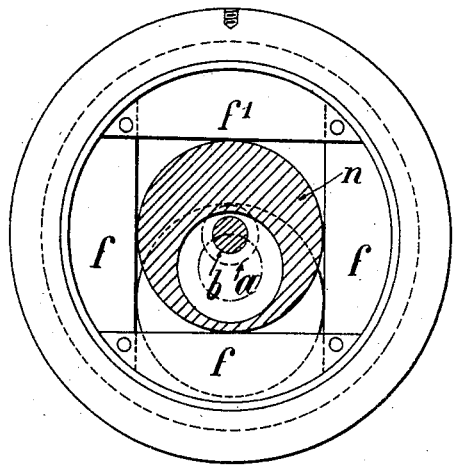

No. 777,740. PATENTED DEC. 20, 1904.
C. MONIN.
VARIABLE SPEED GEAR.
APPLICATION FILED JULY 9, 1904.
NO MODEL. 2 SHEETS—SHEET 1.

No. 777,740. PATENTED DEC. 20, 1904.
C. MONIN.
VARIABLE SPEED GEAR.
APPLICATION FILED JULY 9, 1904.
NO MODEL.
2 SHEETS—SHEET 2.

WITNESSES
Alfred W White
John A. Percival

INVENTOR
Charles Monin
By Richards
ATTORNEYS

No. 777,740.

Patented December 20, 1904.

UNITED STATES PATENT OFFICE.

CHARLES MONIN, OF BOULOGNE-SUR-SEINE, FRANCE.

VARIABLE-SPEED GEAR.

SPECIFICATION forming part of Letters Patent No. 777,740, dated December 20, 1904.

Application filed July 9, 1904. Serial No. 215,922.

*To all whom it may concern:*

Be it known that I, CHARLES MONIN, civil engineer, a citizen of the French Republic, and a resident of 62$^{bis}$ Grande Rue, Boulogne-sur-Seine, in the Republic of France, have invented certain new and useful Improvements in Variable-Speed Gear, of which the following is a specification.

This invention, which relates to improvements in variable-speed gear, is based on the following theoretical considerations.

When a circumference of given diameter rolls in a circumference of double that diameter, any point of the first circumference travels through one diameter of the second circumference, this diameter being a particular form of hypocycloid. If instead of causing the first circumference to roll it is caused to revolve about its center, the latter being stationary, and to revolve the larger circumference, the center of which is also stationary, any given point of the smaller circumference will travel along a radius of the larger circumference and the latter will revolve with an angular speed equal to half that of the smaller circumference, a reduction of speed in the ratio of two to one being thus obtained between the axes of the two circumferences.

In the specification of my patent application filed December 8, 1903, under the Serial No. 184,337, I have described variable-speed gear of this type in which the smaller circumference is that of a plate provided with two pins placed at the ends of one of its diameters, the larger circumference being that of a plate provided with two diametrical grooves perpendicular to each other, the said pins being adapted to slide in the said grooves. By fixing the plate provided with the said pins to a rotary shaft and using an intermediate plate provided on one side with diametrical grooves and on the other side with two additional pins engaging diametrical grooves in a plate fixed to another rotary shaft the speed is twice reduced in the ratio of two to one between the two shafts, so that a total reduction in the ratio of four to one is obtained. In this form of construction the shafts are in alinement with each other.

The improvements to which my present invention relates substantially consist in replacing the two pins at the ends of a diameter of each plate by two fixed eccentrics or cams placed at angles of one hundred and eighty degrees with regard to each other and in making the second shaft tubular and arranging it in such a manner that it surrounds the first shaft. By this means the mechanism is rendered considerably stronger and jamming of the plates and deflection of the shafts are avoided. Various additional advantages are obtained, which will be described hereinafter.

Figure 2:
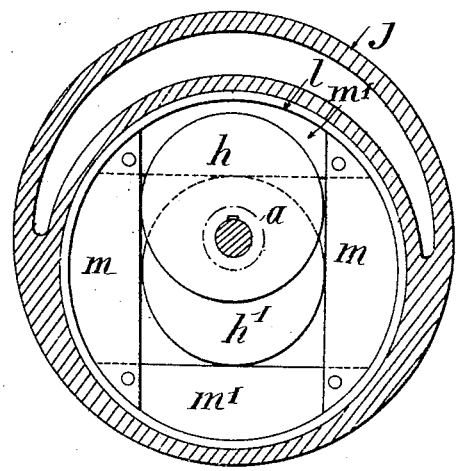
Figure 3:
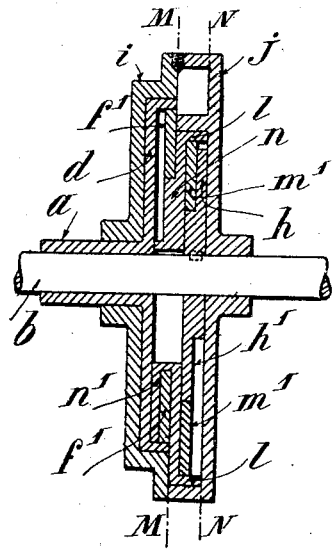
Figure 4:
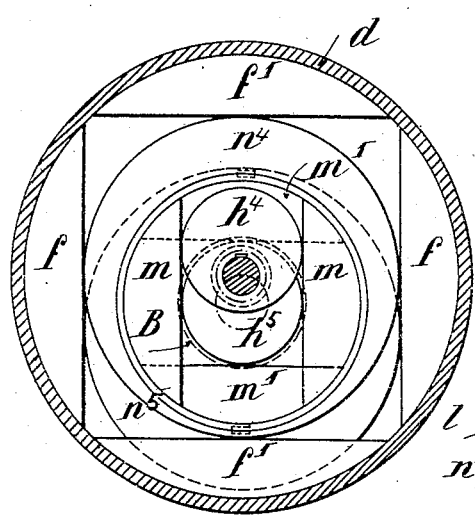
Figure 5:
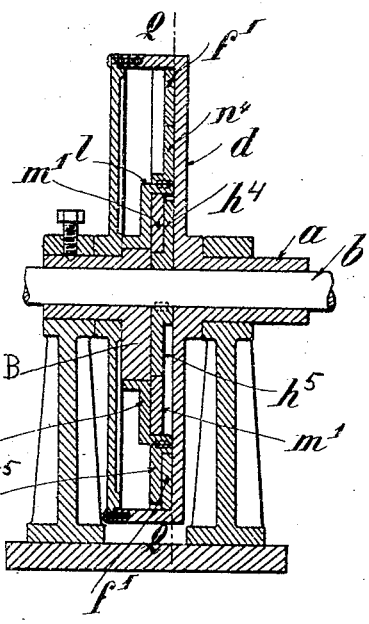

In the accompanying drawings, Figures 1 to 3 illustrate one form of the improved speed-gear, Figs. 1 and 2 being cross-sections on the lines M M N N, respectively, of Fig. 3, and Fig. 3 being a longitudinal section of the gear. Figs. 4 and 5 illustrate a further modification, Fig. 4 being a section on the line Q Q of Fig. 5, and Fig. 5 being a longitudinal section.

Referring to Figs. 1 to 3, the plate $d$, provided with two diametrical recesses crossing each other at right angles, is fixed to the tubular shaft $a$. To the shaft $b$ are fixed the two cams or eccentrics $h$ $h'$, which are placed at angles of one hundred and eighty degrees with regard to each other and serve instead of the plate provided with two pins referred to in the specification of my previous patent. On the shafts $a$ and $b$ are loosely mounted the two dish-like plates $i$ and $j$, which are fixed together at their circumferences. The plate $d$ fits into the dish $i$ in such a manner as to be freely rotatable therein, and the cams $h$ and $h'$ are situated in the dish $j$. The dish $j$ is provided with an eccentric cylindrical recess, into which a plate $l$ fits with slight friction. On one side the said plate $l$ is provided with two diametrical recesses placed crosswise, into which engage the eccentrics $h$ $h'$. To the other sides of the plate $l$ are fixed the two eccentrics or cams $n$ and $n'$, which are also at angles of one hundered and eighty degrees with regard to each other and engage into diametrical recesses in the plate $d$.

The diametrical recesses in the plate $l$ are formed by means of two pairs of segmental parts $m$ $m$ and $m'$ $m'$ integral with the said plate. The cam $h$ engages between the segments $m$ and the cam $h'$ between the segments $m'$, the latter being placed at right angles with regard to the segments $m$.

The diametrical recesses in the plate $d$ are also formed by two pairs of segmental parts $f\,f$ and $f'\,f'$ integral with the said plate, the cam $n$ engaging between the segments $f$ and the cam $n'$ between the segments $f'$.

It will be understood that if the shaft $b$ is caused to revolve the cams $h\,h'$ will move the eccentric plate $l$ and cause the latter to revolve about its center with a speed equal to half that of the shaft $b$. The plate $l$ and the cams $n\,n'$ will at the same time revolve the plate $d$ with a speed equal to half that of the plate $l$, so that the shaft $a$, fixed to the plate $d$, will revolve with a speed equal to one-quarter that of the shaft $b$.

It will be noted that in the construction described the recesses in which the cams move are in different planes and that they cross each other without intersecting each other. By this means gaps in the contact-surfaces for the cams are avoided.

In the form of construction shown in Figs. 4 and 5 the plate $l$ revolves about on eccentric B, which is fixed to the frame and through which the shaft $b$ passes. Otherwise the same parts are used as in the construction shown in Figs. 1, 2, and 3; but the second pair of cams $n^4\,n^5$ is differently mounted, these cams being situated at the circumference of the plate $l$ instead of at the side thereof. The said cams can in this case be fixed to the plate or can be made in one piece with the latter. By this means the driving-cams $h^4$ and $h^5$ and the intermediate cams $n^4$ and $n^5$ are placed in one plane and cross-strains are thus avoided.

Having now described my invention, what I claim as new, and desire to secure by Letters Patent, is—

1. A variable-speed gear allowing of passing from the speed 4 to the speed 1 and vice versa, comprising a rotary shaft $b$ extending through the apparatus, two cams or eccentrics fixed to the shaft $b$ at angles of one hundred and eighty degrees with regard to each other, a tubular rotary shaft $a$ surrounding the shaft $b$ and revolving independently from same, a plate $d$ fixed to the shaft $a$ and provided with two diametrical recesses crossing each other at right angles, an intermediate plate $l$ independent from the shafts $a$ and $b$, placed between the cams and the plate $d$, and provided with two diametrical recesses crossing each other at right angles, means for guiding the plate $l$ in such a manner that it shall be caused to revolve eccentrically about said shafts $a$ and $b$, and two cams or eccentrics fixed on the plate $l$ at one hundred and eighty degrees with regard to each other and engaging the recesses of the plate $d$, substantially as and for the purpose set forth.

2. A variable-speed gear allowing of passing from the speed 4 to the speed 1 and vice versa, comprising a rotary shaft $b$ extending through the apparatus, two cams or eccentrics fixed on the shaft $b$ at angles of one hundred and eighty degrees with regard to each other, a tubular rotary shaft $a$ surrounding the shaft $b$ and revolving independently from same, a plate $d$ fixed to the shaft $a$, segments $f\,f$, $f'\,f'$ fixed to said plate $d$ in such a manner as to form between them two recesses crossing each other at right angles and placed in different planes, an intermediate plate $l$ independent from the shafts $a$ and $b$ and placed between the cams and the first plate $d$, segments $m\,m$, $m'\,m'$ fixed to the plate $l$ so as to form between them two recesses crossing each other at right angles and placed at different planes, means for guiding the plate $l$ in such a manner that it shall be caused to revolve eccentrically about said shafts $a$ and $b$, and two cams or eccentrics fixed on the plate $l$ at one hundred and eighty degrees with regard to each other and engaging the recesses of the plate $d$, substantially as and for the purpose set forth.

3. A variable-speed gear allowing of passing from the speed 4 to the speed 1 and vice versa, comprising a rotary shaft $b$ extending through the apparatus, two cams or eccentrics fixed to the shaft $b$ at angles of one hundred and eighty degrees with regard to each other, a tubular rotary shaft $a$ surrounding the shaft $b$ and revolving independently from same, a plate $d$ fixed to the shaft $a$ and provided with two diametrical recesses crossing each other at right angles, an intermediate plate $l$ independent from the shafts $a$ and $b$, placed between the cams and the plate $d$, and provided with two diametrical recesses crossing each other at right angles, means for guiding the plate $l$ in such a manner that it shall be caused to revolve eccentrically about said shafts $a$ and $b$, and two cams or eccentrics fixed on the circumference of the plate $l$ at one hundred and eighty degrees with regard to each other and engaging the recesses of the plate $d$, substantially as and for the purpose set forth.

In witness whereof I have hereunto set my hand in presence of two witnesses.

CHARLES MONIN.

Witnesses:
ANTOINE LAVOIX,
HANSON C. COXE.